(12) United States Patent
Nagata et al.

(10) Patent No.: US 7,601,945 B2
(45) Date of Patent: Oct. 13, 2009

(54) POSITION DETECTING DEVICE FOR DETECTING THE ABSOLUTE VALUE OF A POSITION OF A MOVABLE MEMBER WHICH HAS A SENSOR MOUNTED THEREON

(75) Inventors: Shinji Nagata, Ibara (JP); Kosuke Sakata, Ibara (JP); Shinichi Kageshita, Ibara (JP)

(73) Assignee: Tazmo Co., Ltd., Okayama (JP)

( * ) Notice: Subject to any disclaimer, the term of this patent is extended or adjusted under 35 U.S.C. 154(b) by 4 days.

(21) Appl. No.: 12/025,804

(22) Filed: Feb. 5, 2008

(65) Prior Publication Data

US 2008/0237504 A1 Oct. 2, 2008

(30) Foreign Application Priority Data

Mar. 26, 2007 (JP) .............................. 2007-079339

(51) Int. Cl.
*H01J 40/14* (2006.01)
(52) U.S. Cl. .................................. 250/221; 250/231.13
(58) Field of Classification Search ................. 250/221, 250/559.29, 559.3, 231.13; 356/616, 617, 356/397–401; 341/11–13
See application file for complete search history.

(56) References Cited

U.S. PATENT DOCUMENTS 4,786,803 A * 11/1988 Majette et al. .......... 250/237 G

FOREIGN PATENT DOCUMENTS

JP 2004-191267 7/2004

\* cited by examiner

*Primary Examiner*—Que T Le
(74) *Attorney, Agent, or Firm*—Renner, Otto, Boisselle & Sklar, LLP

(57) ABSTRACT

A position detecting devices includes a scale, a sensor, and a control section. The scale has a plurality of light emitting elements located at spacings along a direction in which a movable member is moved. Mounted on the member, the sensor detects light from at least one of the elements within a predetermined detection range longer than a largest one of the spacings, and outputs a light reception signal according to a position where the light is received within the range. Upon receipt of the signal, the control section retrieves from the storage section information on a located position of one of the light emitting elements that is being driven, and calculates a position of the member based on the retrieved information and the received signal.

9 Claims, 6 Drawing Sheets

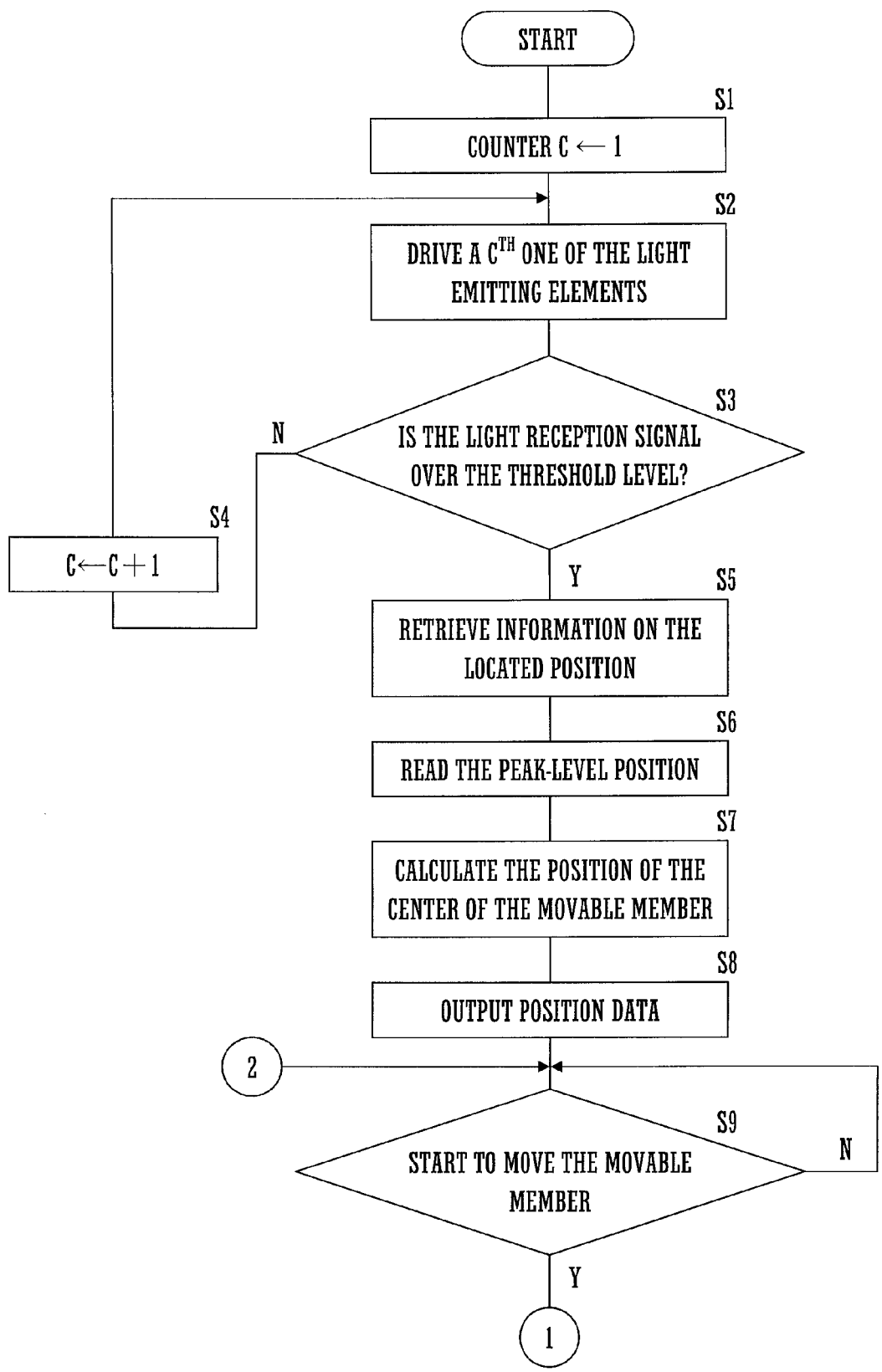

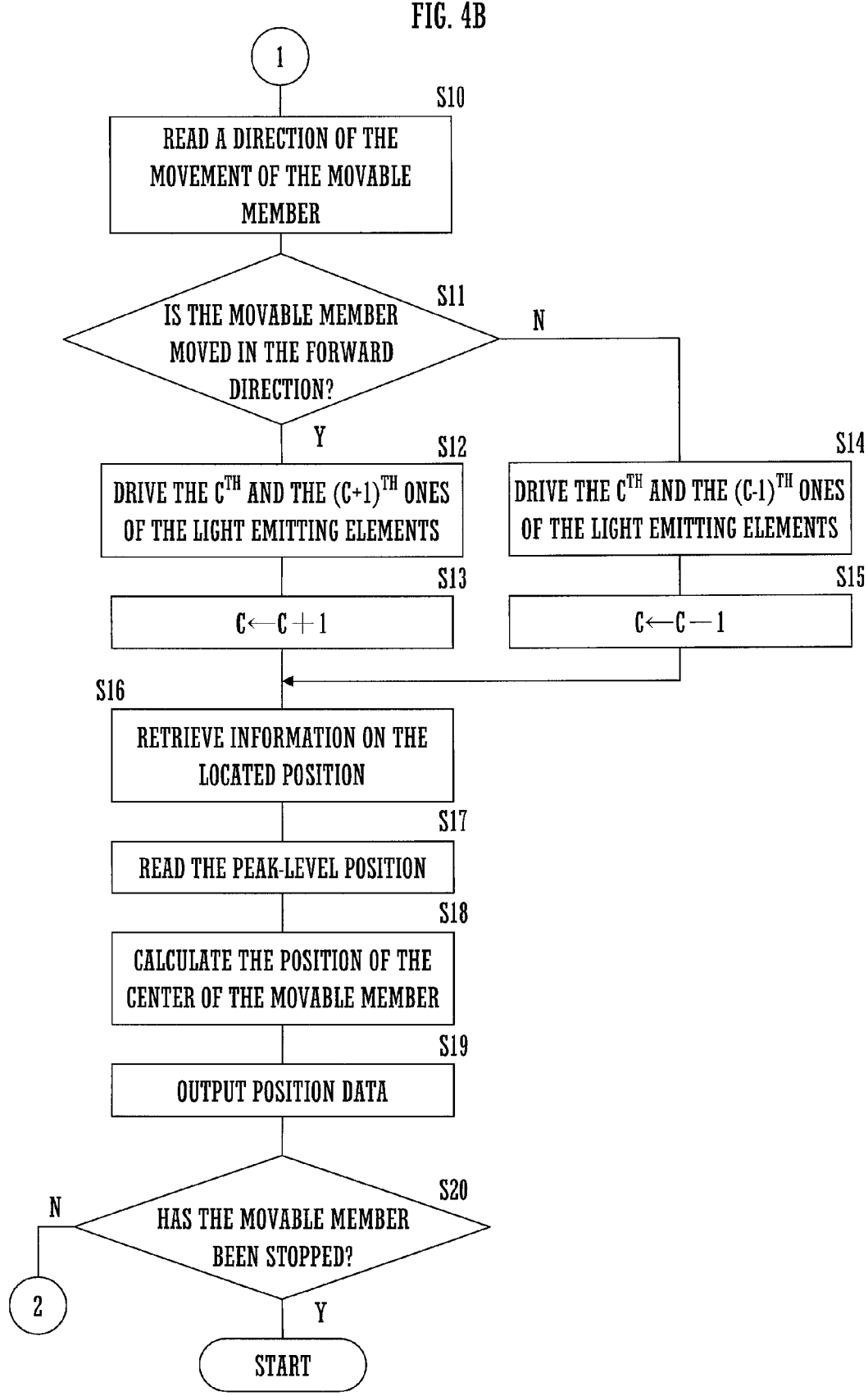

POSITION DETECTING DEVICE FOR DETECTING THE ABSOLUTE VALUE OF A POSITION OF A MOVABLE MEMBER WHICH HAS A SENSOR MOUNTED THEREON

CROSS REFERENCE

This Nonprovisional application claims priority under 35 U.S.C. §119(a) on Patent Application No. 2007-079339 filed in Japan on Mar. 26, 2007, the entire contents of which are hereby incorporated by reference.

BACKGROUND OF THE INVENTION

The invention relates to a position detecting device for detecting the absolute value of a position of a movable member.

As conventional position detecting devices for detecting the position of a movable member, optical encoders such as linear or rotary encoders are known. The optical encoders have patterns, such as slits or diffraction grooves, formed on a scale by use of lithographic or other techniques. The encoders cause an optical sensor mounted on a movable member to irradiate the patterns with light, and detect the relative position of the movable member based on cyclic light reception signals according to the patterns. To detect the absolute position of the movable member, it is necessary to perform what is called the return-to-origin operation, i.e., to move the movable member to an initial position, on startup, in order for another sensor to detect the movable member at the initial position.

JP 2004-191267A discloses a position detecting device that includes a scale with absolute scale markings formed thereon. The absolute scale markings show respective pieces of information on absolute positions on the scale set at predetermined spacings therebetween, as pattern images such as bar codes. The conventional device eliminates the need for performing the return-to-origin operation by reading an absolute scale marking through an image sensor mounted on a movable member and detecting the absolute position of the movable member based on the information shown by the marking as read.

However, this device has the following problems. For high-precision detection of the position of the movable member, first, it is necessary to form on the scale a number of fine pattern images that show respective pieces of information on different absolute positions. Thus, the absolute scale markings need to be precisely formed by use of etching or other techniques, and it is, therefore, not possible to form a single long scale of a size that cannot be processed by the etching device. Different types of short scales, each with different absolute scale markings, are needed for being joined together for use as a long scale. This involves a complicated scale manufacturing process that results in a high production cost of the device.

Second, the fine pattern images as the absolute scale markings are more likely to be detected improperly under conditions such as of: the scale being dirty; vibrations; or there being a distance between the scale and the image sensor.

Finally, it is necessary to mount on the movable member the image sensor which includes a light emitting section, thereby causing a complex wiring or other internal structure for power feeding.

In view of the foregoing, a feature of the invention is to provide a position detecting device that detects precisely the absolute position of a movable member by a sensor, mounted on the movable member, for receiving light irradiated selectively from a plurality of light emitting elements mounted on a scale, while eliminating a complicated manufacturing process, nor a complex internal structure, that could cause an increase in manufacturing cost.

SUMMARY OF THE INVENTION

A position detecting device according to an aspect of the invention includes a scale, a sensor, and a control section. The scale has a plurality of light emitting elements located at spacings therebetween along a direction in which a movable member is moved. The sensor is mounted on the movable member. The sensor detects light radiated from at least one of the light emitting elements within a predetermined detection range that is longer than a largest one of the spacings, and outputs a light reception signal according to a position where the light is received within the detection range. The control section drives the light emitting elements individually and receives the light reception signal from the sensor. The control section has a storage section for storing information on respective located positions of the light emitting elements in the scale. Upon receipt of the light reception signal, the control section retrieves from the storage section information on a located position of one of the light emitting elements that is being driven, and calculates a position of the movable member based on the retrieved information and the light reception signal.

BRIEF DESCRIPTION OF THE DRAWINGS

FIG. 4A and 4B are flowchart illustrating steps of a process performed by the control section.

DETAILED DESCRIPTION OF THE INVENTION

Figure 1:
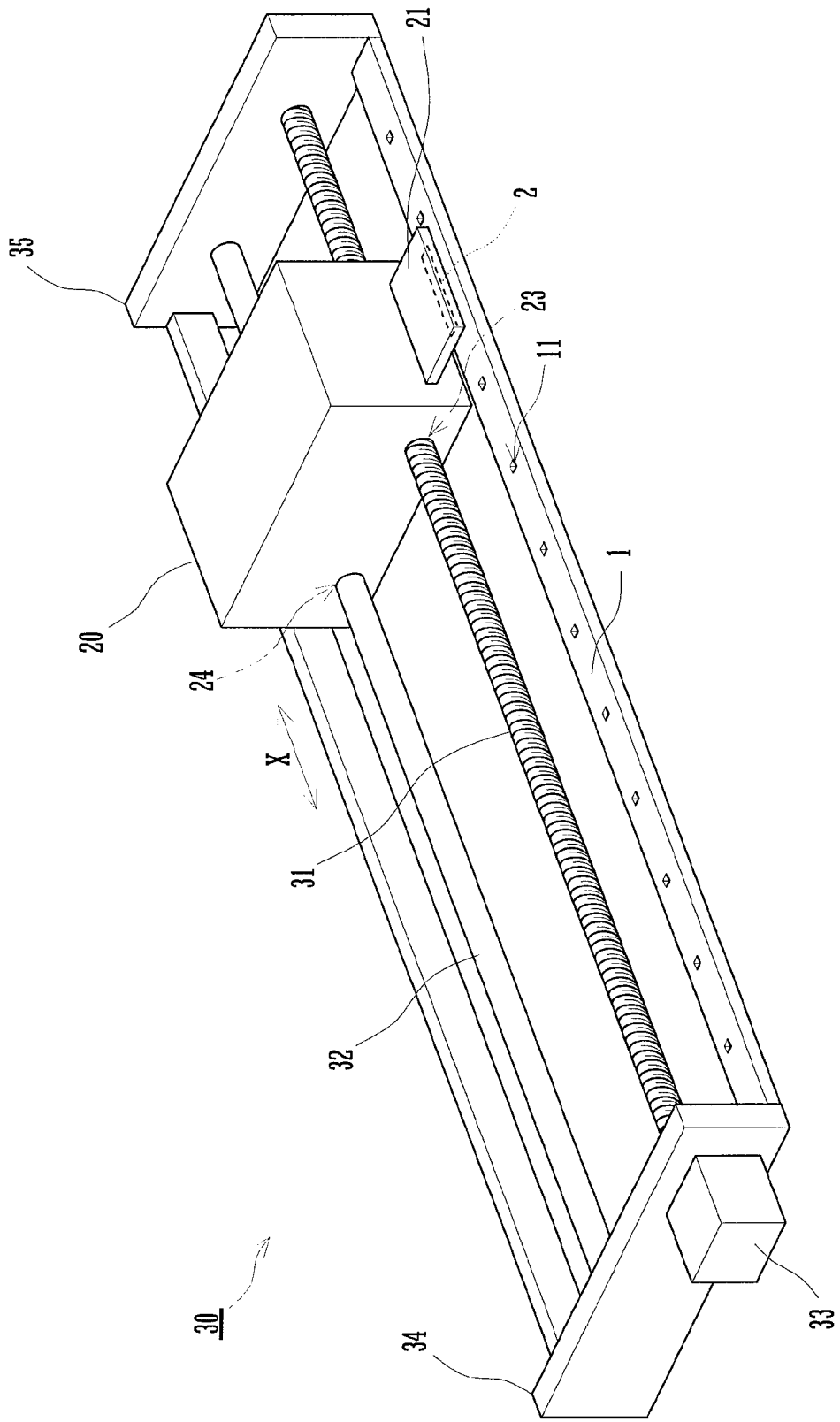
FIG. 1 is an oblique perspective view of a moving mechanism provided in a position detecting device according to an embodiment of the invention.

FIG. 1 is an oblique perspective view of a moving mechanism 30 provided in a position detecting device according to an embodiment of the invention. The moving mechanism 30 includes a threaded rod 31, a guide shaft 32, a motor 33, and frames 34 and 35. The mechanism 30 reciprocates a movable member 20 along a direction X.

With its axis parallel to the direction X, the rod 31 is rotatably supported by the frames 34 and 35. The rod 31 is screwed into a screw hole 23 in the member 20. The shaft 32 is secured to the frames 34 and 35 and arranged parallel to the rod 31. The shaft 32 is passed through a hole 24 in the member 20. The motor 33 is secured to the frame 34. The motor 33 is driven to rotate the rod 31 selectively in forward and reverse directions.

The rotation of the rod 31 moves the member 20 along the direction X.

Between the frames 34 and 35, a scale 1 is mounted with its length parallel to the direction X. The scale 1 is a glass epoxy plate, as an example, having a plurality of holes 11 formed at regular spacings along its length. Fixed to the member 20 is a mounting plate 21. The plate 21 has a light receiving device 2 mounted on its bottom. As an example, the device 2 is a CMOS image sensor provided with 768 light receiving elements. Alternatively, an imaging device other than the CMOS image sensor, such as a CCD image sensor, is also usable as the device 2. The device 2 is arranged in such a manner that the light receiving elements are aligned along the direction X. The plate 21 extends above the scale 1 from a side surface of the member 20. The device 2 is positioned opposite an upper surface of the scale 1. The scale 1 and the device 2 are both included in the position detecting device of the Claims.

Figure 2A:
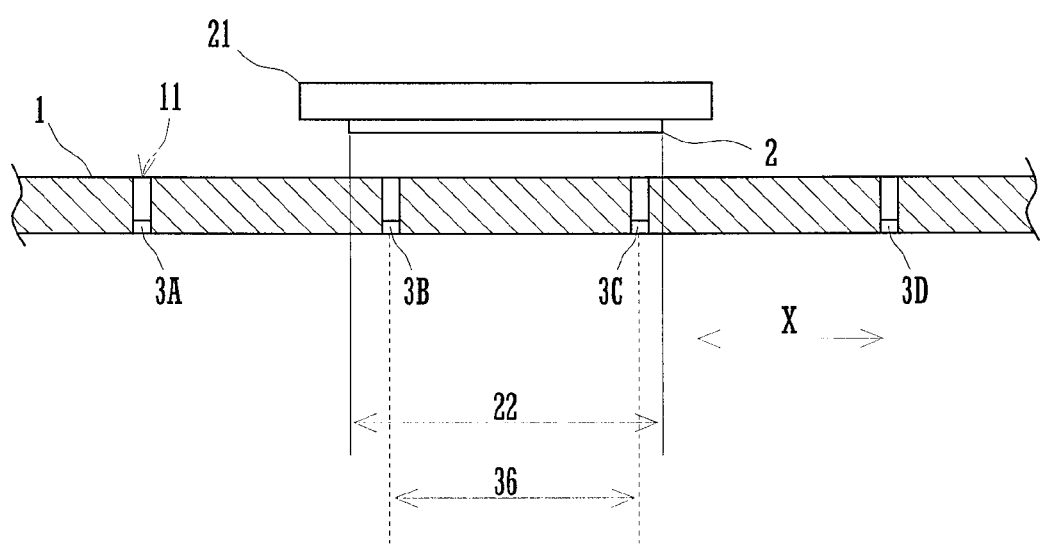
FIG. 2A is a side cross-sectional view of the position detecting device.
Figure 2B:
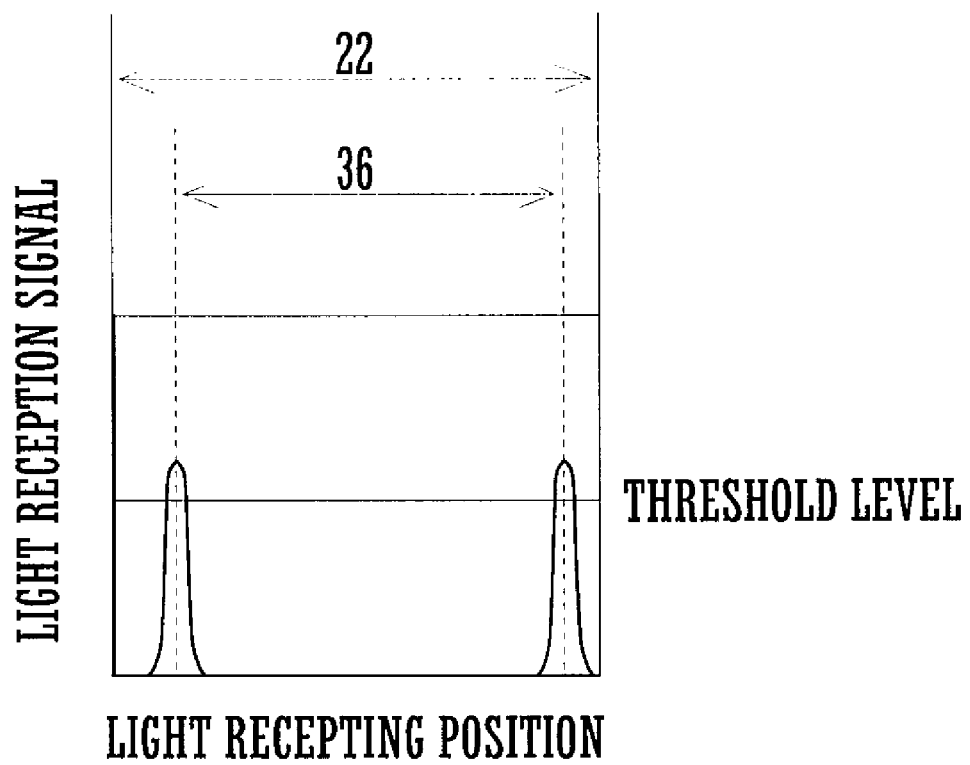
FIG. 2B is a drawing showing a light reception signal output from a light receiving device provided in the position detecting device.

FIG. 2A is a side cross-sectional view of the position detecting device. FIG. 2B is a drawing showing a light reception signal output from the device 2. A plurality of light emitting elements 3 (3A, 3B, 3C, 3D, . . . ) are located in the respective holes 11. The elements 3 are LEDs, as an example. The elements 3 are equally spaced at pitch 36, which corresponds to each of the spacings between the holes 11, along the length of the scale 1. Mounted on the bottom of the plate 21, the device 2 receives light from the elements 3 within a detection range 22. The range 22 is longer than the pitch 36 with respect to the direction X. In a case in which the elements 3 are spaced at unequal pitches, the range 22 is set longer than the longest one of the pitches.

The device 2 outputs a light reception signal according to the amount of light received by the light receiving elements. As a light reception signal, more specifically, the device 2 outputs a level of voltage according to the amount of light received by each light receiving element in the order of arrangement of the light receiving elements. When the elements 3B and 3C are positioned within the range 22, the device 2 outputs a light reception signal having a waveform as illustrated in FIG. 2B.

The device 2 is mounted on the plate 21 in such a manner that a center position of the range 22 along the direction X corresponds to a center position of the member 20 along the direction X.

It is to be noted the holes 11 each shaped into a rectangle having sides parallel to the direction X prevent possible fluctuations in amount of light received by the device 2 due to irregularities in shape of the holes 11 along the direction X.

Figure 3:
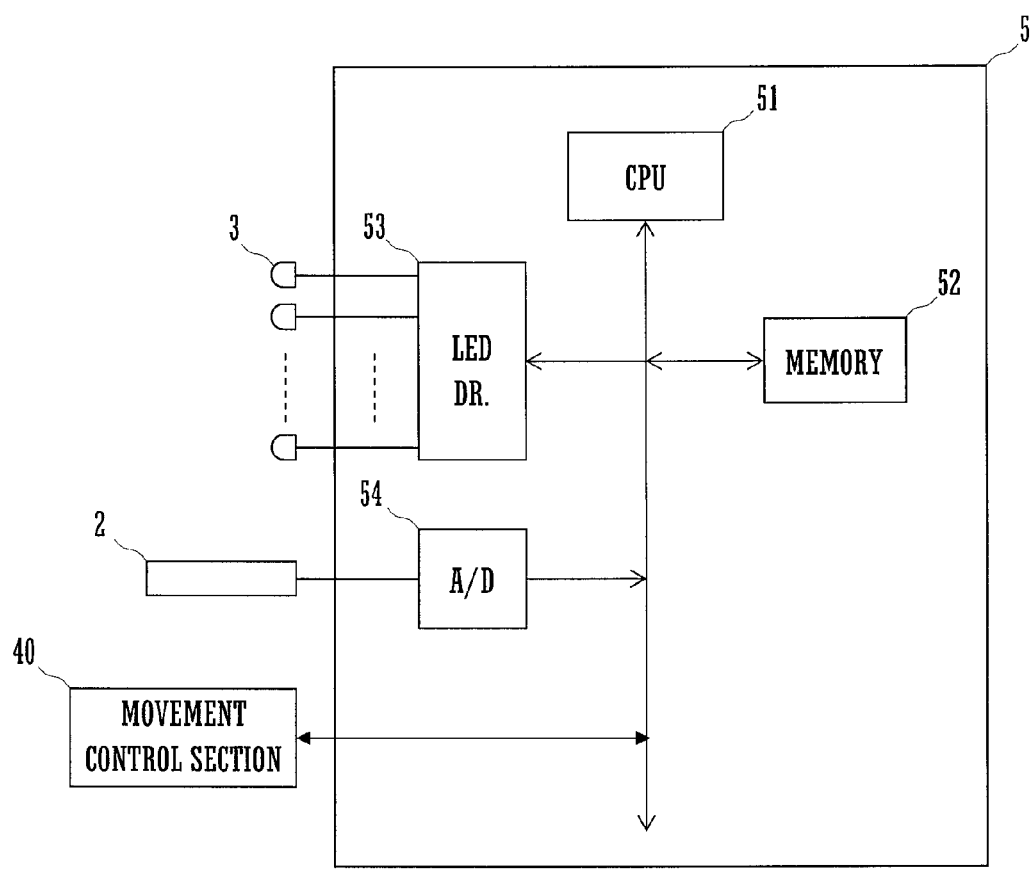
FIG. 3 is a block diagram illustrating a control section provided in the position detecting device.

FIG. 3 is a block diagram illustrating a control section 5 provided in the position detecting device. The control section 5 has a CPU 51, a memory 52, an LED driver 53, and an A/D converter 54. The memory 52, the driver 53, and the converter 54 are connected to the CPU 51. The CPU 51 sends and receives data to and from a movement control section 40 provided in the mechanism 30. Specifically, the CPU 51 sends data on a detected position of the member 20 to the section 40. The section 40 compares the detected position with a target position, and drives the motor 33. The section 40 sends, to the CPU 51, direction data to show a direction in which the motor 33 is driven.

The memory 52 corresponds to the storage section of the Claims. The memory 52 holds information on respective positions where the elements 3 are located in the scale 1 (hereinafter merely as the located positions). As the located position of each of the elements 3, more specifically, the memory 52 holds information on its absolute position, i.e., an absolute value of its distance from an origin point on the scale 1. In the memory 52, the elements 3 are respectively assigned numbers in ascending order in a forward direction along the direction X. Also, the memory 52 has a counter C allocated to a predetermined storage space therein. A number counted by the counter C is used to identify a particular one of the elements 3.

The elements 3 are connected to the LED driver 53. To the driver 53, the CPU 51 outputs driving data with respect to each of the elements 3. Based on the driving data, the driver 53 drives each of the elements 3 individually.

The device 2 is connected to the A/D converter 54. The converter 54 converts a light reception signal output from the device 2 into a digital signal, and inputs the digital signal to the CPU 51.

FIG. 4A and 4B are flowchart illustrating steps of a process performed by the control section 5. When the power is turned on, the CPU 51 sets the counter C to 1 (step S1), and drives a Cth one of the elements 3 identified by a number counted by the counter C (step S2). The CPU 51 reads a light reception signal output from the device 2 to determine whether the level of the light reception signal is over a predetermined threshold level (step S3). When the light reception signal is not over the threshold level, the CPU 51 increments the counter C (step S4). The CPU 51 repeats the sequence from the steps S2 to S4 until a light reception signal exceeds the threshold level.

When a light reception signal exceeds the threshold level, the CPU 51 retrieves from the memory 52 information on the located position of one of the elements 3 that is being driven (step S5), and reads a position where the light reception signal reaches a peak level within the range 22, hereinafter referred to as the peak-level position (step S6). From the information as retrieved and the peak-level position as read, the CPU 51 calculates an absolute position of the center of the member 20 (step S7), and outputs the calculation result to the section 40 as present position data (step S8).

In reading the peak-level position in step S6, the CPU 51 first determines respective positions where the threshold level intersects with rising and falling edges of a waveform of the light reception signal, by using levels of light reception signals of two light receiving elements between which each of the intersecting positions lies.

With respect to the rising edge of the waveform, specifically, an intersecting position b1 where the rising edge crosses the threshold level is calculated from the following equation: $b1 = p\{n + (ya - y1)/(y2 - y1)\}$, where n, n+1 are numbers respectively assigned to light receiving elements that are located immediately before and after the intersecting position; y1, y2 are levels of respective light reception signals of the light receiving elements n, n+1; p is a pitch at which the light receiving elements of the device 2 are spaced; and ya is the threshold level. An intersecting position b2 where the falling edge crosses the threshold level is calculated in a similar manner, and the peak-level position is obtained as a middle point between the positions b1 and b2.

Calculating the peak-level position in the above-described manner allows the position of the member 20 to be detected with higher resolution than that given by the pitch at which the light receiving elements of the device 2 are spaced. This also serves to reduce negative effects of fluctuations in amount of light caused by a potential insufficient supply of power to the light emitting elements 3 or other factors.

Then, the CPU 51 waits until the section 40 starts to move the member 20 (step S9), and, when the member 20 starts to be moved, reads a direction of the movement of the member 20 from directional data sent by the section 40 (step S10).

When the member 20 is moved in the forward direction, the CPU 51 drives the Cth one of the elements 3 identified by the number counted by the counter C, and a (C+1)th one of the elements 3 that is adjacent thereto along the forward direction (steps S11, S12). At this time, the CPU 51 increments the counter C (step S13).

When the member 20 is moved in a backward direction, the CPU 51 drives the Cth one of the elements 3 identified by the number counted by the counter C, and a (C−1)th one of the elements 3 that is adjacent thereto along the backward direction (steps S11, S14). At this time, the CPU 51 decrements the counter C (step S15).

After driving the two light emitting elements, the CPU 51 retrieves information on the respective positions of the light emitting elements being driven from the memory 52 (step S16), and reads a peak-level position of a light reception signal within the range 22 (step S17). From the positional information as retrieved and the peak-level position as read, the CPU 51 calculates an absolute position of the center of the member 20 (step S18), and outputs the calculation result to the section 40 as present position data (step S19). The CPU 51 repeats the cycle of steps S9 to S19 until the member 20 is stopped (step S20).

In calculating the absolute position of the center of the member 20 in steps S7 and S18, the CPU 51 adds or subtracts, to or from the as-retrieved located position of the light emitting element being driven, a distance from the center position of the device 2 to the peak-level position. In a case in which the light reception signal includes two peak levels in step S18, the CPU 51 calculates a distance from the center position of the device 2 to a position of a light receiving element corresponding to a middle position between the two peak-level positions, and adds or subtracts the distance to or from a middle position between the respective located positions of the two light emitting elements. The calculation of the middle position between the two peak-level positions allows the position of the member 20 to be calculated with a higher resolution than that of the device 2.

By performing the foregoing process, the position detecting device detects the absolute position of the member 20 with a simple configuration. Also, making a period of the cycle of steps S9 to S19 shorter than time that the member 20 takes to travel half the length of the pitch 36 allows the device 2 to continue to receive light from one of the two light emitting elements being driven that is positioned forward in the direction of movement of the member 20. This allows continuous detection of the member 20 without losing track of which of the light emitting elements the device 2 receives light from.

In a case in which a distance that the member 20 travels in a cycle period in which the CPU 51 reads a light reception signal (i.e., the period of cycle of steps S9 to S19) is sufficiently short compared to the length of the device 2 and there are sufficiently small fluctuations in the travel distance, it is possible to tell a direction of movement of the member 20 from a direction of movement of peak-level positions without reading directional data sent by the section 40 in step S10.

For example, the light emitting element being driven when the peak-level position of the light reception signal is read in step S6 (or a first primary light emitting element), and light emitting elements on both sides of the first primary light emitting element (or first secondary light emitting elements), are driven after the member 20 starts to be moved. When the member 20 is being moved rightward, the peak-level position is moved leftward within the device 2. The peak-level position has reached a left-side end of the device 2, when a new peak-level waveform appears on a right-side end of the device 2. Next, the light emitting element on the right side of the first primary light emitting element (or a second primary light emitting element), and light emitting elements on both sides of the second primary light emitting element (or second secondary light emitting elements), are driven. This allows continuous detection of the position of the member 20. The position of the member 20 can be detected continuously in a similar manner when the member 20 is being moved leftward.

Also, measuring the respective located positions of the light emitting elements after the scale 1 is formed and then storing the measured values in the memory 52 eliminate the need for precise positioning of the light emitting elements in the scale 1, thereby simplifying the process for manufacturing the position detecting device. Further, a long scale can be formed easily by joining a plurality of scales 1 having the same shape.

Alternatively, the control section 5 may be provided with input means by means of which the respective located positions of the light emitting elements measured after the position detecting device is put into use are entered to update the contents of the memory 52. The provision of the input means thus can cope with deformation of the scale 1 with time. In a case in which the section 5 is not provided with the input means, however, a similar effect can be achieved by causing the device 2 to measure a space between each adjacent pair of the light emitting elements sequentially in order to determine the respective absolute positions of the light emitting elements with reference to the position of one of the light emitting elements located on an end of the scale 1 as the origin point and by storing the measurement results in the memory 52 in an updatable manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A position detecting device for detecting an absolute position of a movable member adapted to be moved along a predetermined direction, the position detecting device comprising:
   a scale having a plurality of light emitting elements located at spacings therebetween along the direction;
   a sensor, mounted on the movable member, for detecting light radiated from at least one of the light emitting elements within a predetermined detection range that is longer than a largest one of the spacings and for outputting a light reception signal according to a position where the light is received within the detection range; and
   a control section for driving the light emitting elements individually and receiving the light reception signal from the sensor, the control section having a storage section for storing information on respective located positions of the light emitting elements in the scale,
   wherein, upon receipt of the light reception signal, the control section retrieves from the storage section information on a located position of at least one of the light emitting elements that is being driven, and calculates a position of the movable member based on the retrieved information and the light reception signal.

2. The position detecting device according to claim 1, wherein the control section stores the information on the respective located positions of the light emitting elements in the scale, in the storage section in an updatable manner.

3. The position detecting device according to claim 2, wherein the control section updates contents of the storage section based on a light reception signal received when an adjacent pair of the light emitting elements are driven.

4. The position detecting device according to claim 1, wherein the sensor outputs a light reception signal in a period that is shorter than time that the movable member takes to travel half length of the regular spacing.

5. The position detecting device according to claim 2, wherein the sensor outputs a light reception signal in a period that is shorter than time that the movable member takes to travel half length of the regular spacing.

6. The position detecting device according to claim 3, wherein the sensor outputs a light reception signal in a period that is shorter than time that the movable member takes to travel half length of the regular spacing.

7. The position detecting device according to claim 4, wherein the control section:
- before the movable member starts to be moved, drives the light emitting elements sequentially, and
- after the movable member starts to be moved, drives a primary light emitting element from which the sensor receives light, and a secondary light emitting element positioned adjacent to the primary light emitting element, among the light emitting elements.

8. The position detecting device according to claim 5, wherein the control section:
- before the movable member starts to be moved, drives the light emitting elements sequentially, and
- after the movable member starts to be moved, drives a primary light emitting element from which the sensor receives light, and a secondary light emitting element positioned adjacent to the primary light emitting element, among the light emitting elements.

9. The position detecting device according to claim 6, wherein the control section:
- before the movable member starts to be moved, drives the light emitting elements sequentially, and
- after the movable member starts to be moved, drives a primary light emitting element from which the sensor receives light, and a secondary light emitting element positioned adjacent to the primary light emitting element, among the light emitting elements.

\* \* \* \* \*